(12) United States Patent
Lee et al.

(10) Patent No.: US 8,169,420 B2
(45) Date of Patent: May 1, 2012

(54) REPORTING OPTICAL TRACKING DATA BASED ON INTEGRATED RESOLUTION SWITCHING AND SURFACE DETECTION

(75) Inventors: Wui Pin Lee, Penang (MY); Jin Kiong Ang, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1122 days.

(21) Appl. No.: 12/025,951

(22) Filed: Feb. 5, 2008

(65) Prior Publication Data

US 2009/0195503 A1    Aug. 6, 2009

(51) Int. Cl.
*G06F 3/042* (2006.01)
(52) U.S. Cl. .................... 345/175; 345/166; 345/173
(58) Field of Classification Search ........... 345/157–167
See application file for complete search history.

(56) References Cited

U.S. PATENT DOCUMENTS

| | | | |
|---|---|---|---|
| 5,578,817 A * | 11/1996 | Bidiville et al. | 250/221 |
| 5,801,681 A * | 9/1998 | Sayag | 345/157 |
| 6,303,924 B1 * | 10/2001 | Adan et al. | 250/221 |
| 6,657,184 B2 * | 12/2003 | Anderson et al. | 250/221 |
| 6,664,948 B2 * | 12/2003 | Crane et al. | 345/166 |
| 6,791,531 B1 * | 9/2004 | Johnston et al. | 345/157 |
| 6,977,645 B2 * | 12/2005 | Brosnan | 345/166 |
| 7,161,682 B2 * | 1/2007 | Xie et al. | 356/520 |
| 7,292,232 B2 * | 11/2007 | Ranta et al. | 345/175 |
| 7,675,630 B2 * | 3/2010 | Teo et al. | 356/614 |
| 7,889,178 B2 * | 2/2011 | Chan et al. | 345/166 |
| 2002/0180691 A1 * | 12/2002 | Wong et al. | 345/156 |
| 2004/0130532 A1 * | 7/2004 | Gordon et al. | 345/166 |
| 2004/0234107 A1 | 11/2004 | Machida | |
| 2005/0001153 A1 * | 1/2005 | Lauffenburger et al. | 250/221 |
| 2005/0001817 A1 * | 1/2005 | Lauffenburger et al. | 345/166 |
| 2005/0035947 A1 * | 2/2005 | Lutian | 345/166 |
| 2005/0151724 A1 * | 7/2005 | Lin et al. | 345/166 |
| 2006/0132435 A1 | 6/2006 | Machida | |
| 2007/0171204 A1 * | 7/2007 | Afriat et al. | 345/166 |
| 2007/0247428 A1 * | 10/2007 | Hock et al. | 345/166 |
| 2008/0007526 A1 * | 1/2008 | Xu et al. | 345/163 |
| 2008/0062131 A1 * | 3/2008 | Chan et al. | 345/166 |
| 2008/0204413 A1 * | 8/2008 | Wu et al. | 345/161 |

\* cited by examiner

*Primary Examiner* — Richard Hjerpe
*Assistant Examiner* — Dorothy Harris

(57) ABSTRACT

An integrated resolution switching surface detection system for an optical navigation device. The integrated resolution switching surface detection system includes a resolution switching engine, a surface detection engine, and a navigation engine. The resolution switching engine sets a resolution status based on a motion speed of a tracking surface relative to a navigation sensor, wherein the motion speed is a measure of motion data over time. The surface detection engine sets a surface detection status based on the resolution status that is set by the resolution engine. The navigation engine reads motion data from the navigation sensor and reports the motion data to a computing device according to the surface detection status that is set by the surface detection engine. Embodiments of the integrated resolution switching surface detection system maintain smooth and predictable cursor movement associated with a plurality of finger assert and finger de-assert events.

16 Claims, 7 Drawing Sheets

REPORTING OPTICAL TRACKING DATA BASED ON INTEGRATED RESOLUTION SWITCHING AND SURFACE DETECTION

BACKGROUND OF THE INVENTION

Optical navigation systems operate to relative track movement between a target surface and an optical navigation device. Optical navigation systems translate the detected movement into a corresponding movement of a cursor on a monitor screen of a computing device. An optical navigation system uses a light source such as a light-emitting diode (LED) or a laser diode to illuminate a region of a target surface. The optical navigation system also uses a navigation sensor to receive the light reflected from the target surface to successively capture frames of image data of the target surface. The optical navigation system compares the successive image frames and estimates the relative movements based on the comparison between the current image frame and a previous image frame. The comparison is based on detecting and computing displacements of features of the tracking surface in the captured frames of image data.

An increasingly popular form of optical navigation is optical finger navigation (OFN). OFN devices operate similarly to an optical mouse, except that the navigation sensor is generally facing up or to the side of the optical navigation device and, instead of tracking a working surface or the surface of a mouse pad, the tracking surface of the OFN device is a user's finger or digit. A user controls the movement of a cursor on a monitor screen of a computing device by placing a finger within the tracking plane of the OFN device and moving the finger accordingly.

During operation, the OFN detects both finger asserts, or when the finger is within the tracking plane of the OFN navigation sensor, and finger de-asserts, or when the finger is out of the tracking plane of the OFN navigation sensor. Finger asserts and de-asserts of conventional OFN devices can cause unintended cursor movement, jittery movement, and sudden jumps of the cursor. Furthermore, the erratic behavior of the cursor is made worse with varying speeds of finger asserts and finger de-asserts.

SUMMARY OF THE INVENTION

Embodiments of a system are described. In one embodiment, the system is an optical navigation system. The optical navigation system includes a resolution switching engine, a surface detection engine coupled to the resolution switching engine, and a navigation engine. The resolution switching engine sets a resolution status based on a motion speed of a tracking surface relative to a navigation sensor, wherein the motion speed is a measure of motion data over time. The surface detection engine sets a surface detection status based on the resolution status that is set by the resolution switching engine. The navigation engine reads motion data from the navigation sensor and reports the motion data to a computing device according to the surface detection status that is set by the surface detection engine. Other embodiments of the system are also described.

Embodiments of a method are also described. In one embodiment, the method is a method for integrating a resolution switching operation with a surface detection operation. The integrated resolution switching surface detection method includes setting a resolution status based on a motion speed of a tracking surface relative to a navigation sensor, wherein the motion speed is a measure of motion data over time. The integrated resolution switching surface detection method also includes setting a surface detection status based on the resolution status that is set by the resolution switching engine. The integrated resolution switching surface detection method also includes reading motion data from the navigation sensor and reporting the motion data to a computing device according to the surface detection status that is set by the surface detection engine. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
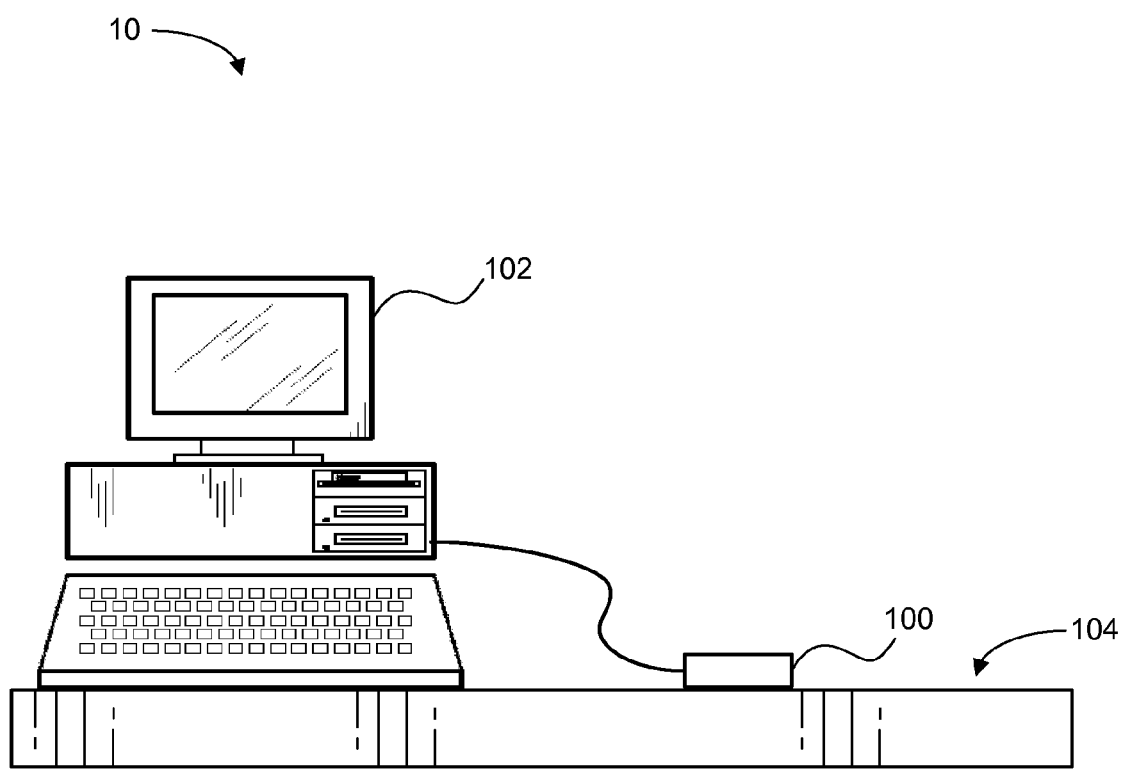
FIG. 1 depicts a schematic diagram of one embodiment of a computer system.

FIG. 1 depicts a schematic diagram of one embodiment of a computer system 10. As depicted in FIG. 1, the computer system 10 includes an optical navigation system 100 connected to a computing device 102 such as a personal computer. In general, the optical navigation system 100 is placed on a work area 104 and tracks a user's movement to control a cursor displayed on the computing device 102. For example, the optical navigation system 100 tracks the movement of the user's finger relative to the optical navigation device 100. However, in other embodiments, the optical navigation system 100 may be used with different products for various tracking applications. In some embodiments, the computing device 102 is a desktop or laptop computer. In other embodiments, the computing device 102 is a personal digital assistant, a cellular phone device, a media player, a remote controller, or any other type of computing device which receives an input. As described in more detail below, the optical navigation system 100 is configured to selectively set the surface detection status of the optical navigation system 100 based on the resolution at which the optical navigation system 100 is being operated. In particular, at high resolutions, a finger is detected at the optical navigation system 100 when a shutter value is at or below a predefined threshold.

Figure 2:
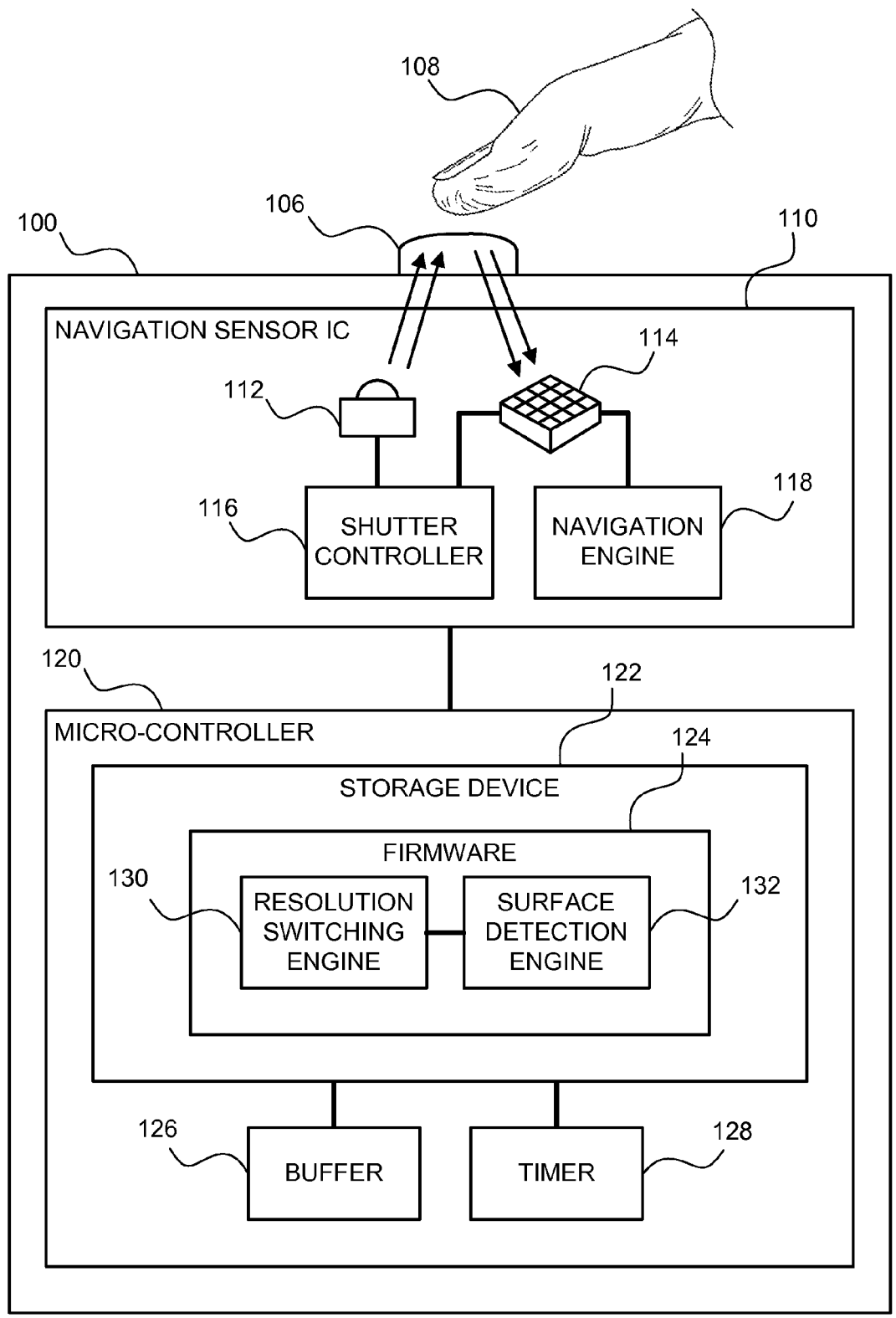
FIG. 2 depicts a schematic diagram of one embodiment of the optical navigation system of FIG. 1.

FIG. 2 illustrates a schematic diagram of one embodiment of the optical navigation system 100 of FIG. 1. The optical navigation system 100 includes a finger interface 106, a navigation sensor integrated circuit (IC) 110, and a micro-controller 120. Although certain component parts are shown in conjunction with the optical navigation system 100 of FIG. 2, other embodiments may include fewer or more component parts, or equivalent parts to perform fewer or more surface detection and motion data reporting functions. Additionally, while the components of the optical navigation system 100 are shown in FIG. 2 as being separate components, some of these components may be integrated. In some embodiments, every component of the optical navigation system 100 may be integrated. Furthermore, some of the components of the optical navigation system 100 may be implemented in any combination of software, hardware, and/or firmware.

The optical navigation system 100 relies on the movement of a finger 108 (or other digit) across the finger interface 106 to generate navigation signals that can be used by the computing device 102 to move a cursor on a display of the computing device 102. Although embodiments are described as tracking finger movement, some embodiments may track movements of other digits such as a thumb. As depicted, the finger interface 106 is a transparent lens that extends outside of a housing of the optical navigation system 100 and has a convex imaging surface across which the digit 108 may move. In another embodiment, the finger interface 106 may be mounted flush with or be recessed within the surrounding structure and housing of the optical navigation system 100. In another embodiment, the imaging surface of the finger interface 104 may be flat or convex in shape.

The depicted navigation sensor IC 110 is an integrated circuit that may integrate multiple components of the optical navigation system 100 on a single integrated circuit. The navigation sensor IC 110 includes a light source 112, a navigation sensor 114, a shutter controller 116, and a navigation engine 118. In one embodiment, the navigation sensor IC 110 communicates motion related data to a micro-controller 120 for further processing.

The light source 112 is configured to generate light in response to an applied driving signal. The light source 112 can be any type of a light emitting device such as a light-emitting diode or a laser diode. As an example, the light source may be a vertical-cavity surface-emitting laser (VCSEL), which generates coherent laser beam of light. The light source 112 is activated by a driver circuit (not shown) which provides driving signals to the light source 112. The light from the light source 112 is focused onto a region of the finger interface 104. When a digit 108 moves across the finger interface 106, light from the light source 112 reflects off the digit 108 and falls on the navigation sensor 114.

The illustrated navigation sensor 114 includes a plurality of photosensitive pixel elements configured to capture frames of image data in response to light incident on the elements. The images are captured by the navigation sensor 114 at a certain frame rate. By capturing a plurality of images of an illuminated digit 108 moving across the finger interface 106, the captured images are processed and examined to determine movement of the digit 108 relative to the finger interface 106. As an example, the navigation sensor 114 may be a charge-coupled device (CCD) image sensor or a complementary metal oxide semiconductor (CMOS) image sensor. The number of photosensitive pixel elements included in the navigation sensor 114 may vary depending on at least the particular application of the optical navigation system 100.

The navigation sensor 114 generates a pixelated representation of the ridges and other surface features of a digit 108 on the finger interface 106 and generates shifted versions thereof as the digit 108 moves across the finger interface 106. The navigation engine 118 then correlates frames of the pixelated representations to produce directional delta X and delta Y signals indicative of the motion of the digit 108 along X and Y axes while the digit 108 is in the tracking plane of the finger interface 106. Each signal includes sign information, negative or positive, which indicates direction, and a magnitude, which indicates the amount of displacement in the indicated direction. In one embodiment, the navigation engine 118 reports the motion data to the computing device 102 as tracking data, which the computing device 102 translates as cursor movements on a monitor screen of the computing device 102. In some embodiments, the navigation engine 118 includes a digital signal processor that processes a digitized representation of the analog signals generated by the navigation sensor 114.

The depicted shutter controller 116 controls the exposure rate for capturing images at a given frame rate. Thus, the shutter value is inversely proportional to the given frame rate. In one embodiment, the shutter controller 116 samples the captured images on a continuous basis in order to measure the saturation levels of each captured image. The shutter controller 116 determines whether there are too many minimum or maximum saturation levels, and adjusts accordingly so that successively captured images have a similar exposure. Thus, the exposure of light received by the navigation sensor 114 is modified in accordance with the shutter value of the shutter controller 116. Furthermore, the shutter controller 116 may adjust the driving signal of the light source 112 according to the measured saturation levels. For example, when a digit 108 is moving across the finger interface 106, light generated by the light source 112 is reflected back to the navigation sensor 114, and thus the shutter value is decreased. Conversely, when the digit 108 is pulled away from the finger interface 106, there is no longer a reflection of light from the digit 108 reflecting back to the navigation sensor 114, and thus the shutter value is increased until it hits the design limit.

The illustrated micro-controller 120 includes a storage device 122, a buffer 126, and a timer 128. In one embodiment, the micro-controller 120 controls the surface detection and motion data reporting process. In another embodiment, the micro-controller 120 sends signals (e.g., a control signal) to the navigation sensor IC 110. In this embodiment, the micro-controller 120 also receives signals (e.g., a memory access signal) from the navigation sensor IC 110. Other embodiments of the micro-controller 120 may transmit and receive other types of signals to and from the navigation sensor IC 110. In some embodiments, the micro-controller 120 implements a variety of functions, including transmitting data to and receiving data from the computing device 102.

The depicted storage device 122 includes firmware 124. Other embodiments may include fewer or more storage components. In one embodiment, the firmware 124 performs operations of the surface detection and motion data reporting process. In some embodiments, parts of the shutter controller 116 and navigation engine 118 may be implemented in the firmware 124. The illustrated firmware 124 includes a resolution switching engine 130 and a surface detection engine 132. In one embodiment, the resolution switching engine 130 and the surface detection engine 132 are fully integrated in the navigation sensor IC 110. In an alternative embodiment, the resolution switching engine 130 and the surface detection engine 132 are at least partially integrated into the navigation sensor IC 110.

In one embodiment, the resolution switching engine 130 is configured to automatically switch or set the resolution of the optical navigation system 100 to an effective resolution based on a detected speed of a moving digit 108 relative to the finger interface 106. The resolution switching engine 130 sets the status of the resolution during a continuously running test cycle, or resolution switching test cycle, during which the resolution switching engine 130 determines the speed of the moving digit 108 according to a plurality of resolution thresholds. The timer 128 triggers the resolution switching engine 130 to start a resolution switching test cycle. The speed of a moving digit 108 can be determined using the directional delta X and delta Y signals from the navigation engine 118 in conjunction with the timer 128, as the delta X and delta Y signals are measured over a certain time. In one embodiment, the current resolution is selected from a high resolution, a mid resolution, and a low resolution. In other embodiments, the resolution may be selected from any number of possible resolutions, including discrete and continuous resolution values.

In one embodiment, the surface detection engine 132 is configured to set the surface detection status based on the current resolution status. The surface detection status, or lift state, is the state of the digit 108 relative to the finger interface 106. In other words, the surface detection status indicates whether the digit 108 is asserted within the tracking plane of the navigation sensor 114 or de-asserted out of the tracking plane of the navigation sensor 114. When the finger 108 is asserted on the finger interface 106, the lift state is calculated as false, or a logical zero, in one embodiment. When the finger 108 is lifted, or de-asserted from the finger interface 106, the lift state is calculated as true, or a logical one, in the same embodiment. Other embodiments may use other conventions for the lift state.

The surface detection engine 132 uses the current shutter value from the shutter controller 116 to set the current lift state. The surface detection engine 132 sets the status of surface detection during a continuously running test cycle, or surface detection test cycle, based on the current resolution status determined in the resolution switching test cycle. Thus, the two cycles are integrated in determining the present surface detection status, or lift state.

As the current motion data, delta X and delta Y, are cycled during the integrated resolution switching test cycle and surface detection test cycle, the surface detection engine 132 accumulates at least one set of subsequent motion data delta X and delta Y from the navigation engine 118, and the buffer 126 buffers the absolute value of the subsequent motion data, delta X and delta Y, for use during the subsequent test cycles. Instead of using the shutter value from the shutter controller 116, in one embodiment, the surface detection engine 132 may use a surface quality (SQUAL) value to set the current lift state. The SQUAL value is a characteristic of light emitted or projected by the light source 112 and reflected off a target surface, in this case a digit 108 of a user. The value of the SQUAL varies depending on the characteristics of a user's digit 108. Thus, the surface detection engine 132 may detect the characteristics of a user's digit 108 and then determine the lift state based on the presence or absence of those detected characteristics of the user's digit 108.

In conjunction with the resolution switching and surface detection test cycles described above, the navigation engine 118 may then report the motion data, delta X and delta Y, to the computing device according to the present lift state. Based on the present lift state, the buffer 126 buffers the absolute value of motion data accumulated by the surface detection engine 132, and the navigation engine 118 reports the cycled motion data to a computing device 102. Cycled motion data is the motion data that has been processed in the resolution switching and surface detection processes during their respective test cycles. Otherwise, the navigation engine may discard the cycled motion data, and the buffer may discard the accumulated motion data based on the present lift state. In one embodiment, motion data, including delta X, delta Y, shutter value, and surface quality are passed to the micro-controller 120 for processing by the resolution switching engine 130 and the surface detection engine 132. Depending on the outcome of the processing, the motion data is then reported to the computing device 102 as associated movement of the cursor. In some embodiments, the navigation engine 118 is configured to multiply the reported motion data by a scalar according to the present resolution status set during a resolution switching test cycle.

Figure 3:
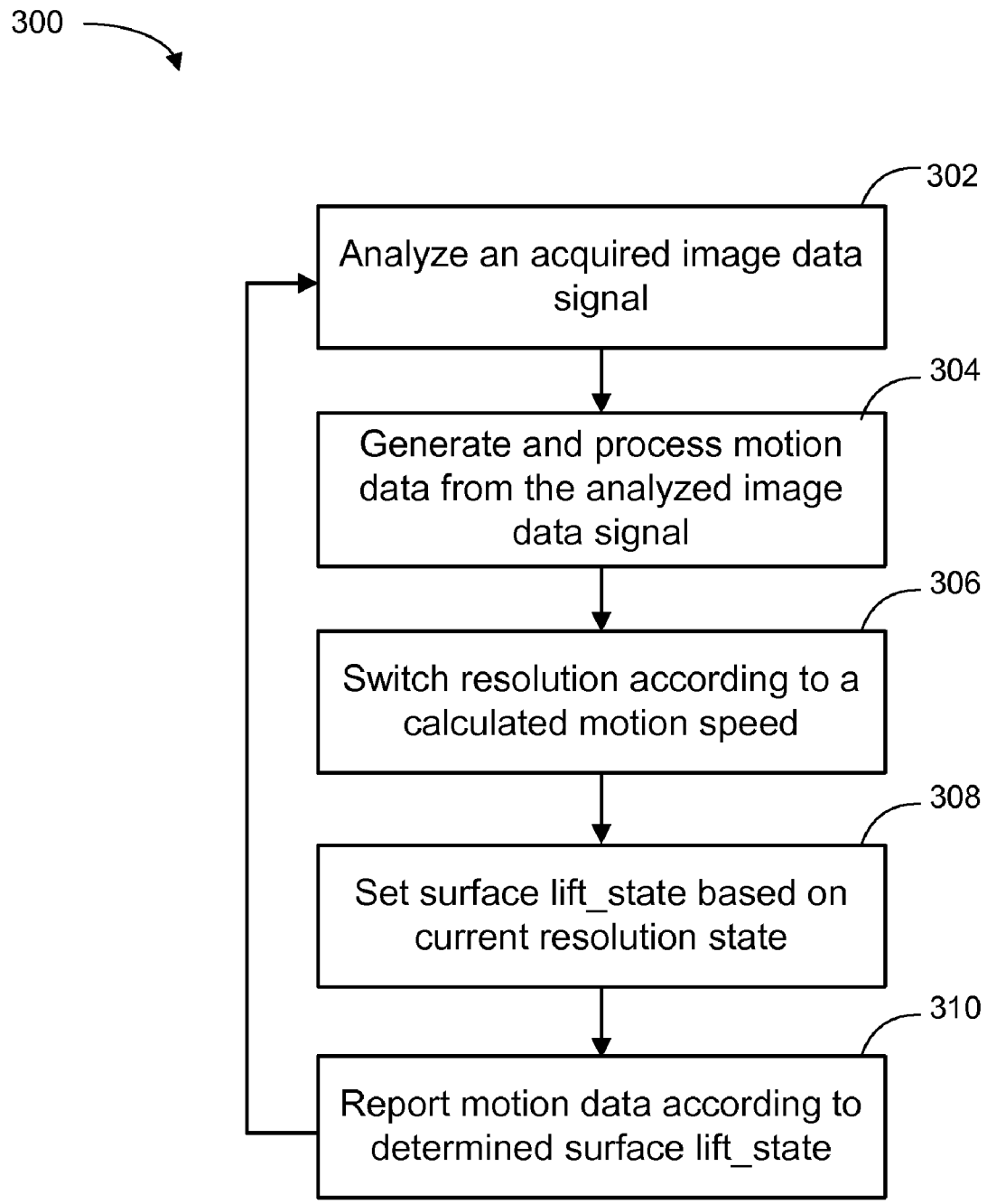
FIG. 3 depicts a schematic flow chart diagram of one embodiment of an integrated resolution switching surface detection method for use with the optical navigation system of FIG. 2.

FIG. 3 depicts a schematic flow chart diagram of one embodiment of an integrated resolution switching surface detection method 300 for use with the optical navigation system 100 of FIG. 2. The integrated resolution switching surface detection method 300 integrates the resolution switching and surface detection processes described above. Although the integrated resolution switching surface detection method 300 is described in conjunction with the optical navigation system 100 of FIG. 2, some embodiments of the method 300 may be implemented with other types of optical navigation systems.

At block 302, the navigation engine 118 acquires an image data signal from the navigation sensor 114 and analyzes the signal. In one embodiment, the navigation engine 118 analyzes the image data signal in order to derive analog motion data from successively captured images that are captured by the navigation sensor 114. The navigation engine 118 may then convert the analog motion data, delta X and delta Y, to a digital representation of the analog motion data. At block 304, the navigation engine 118 processes the motion data that is generated from the analyzed image data signal. In one embodiment, the navigation engine 118 includes a digital signal processor (DSP) to process a digital representation of the motion data.

At block 306, the resolution switching engine 130 switches or sets the current resolution according to a calculated motion speed. As explained above, the resolution switching engine 130 runs a continuous resolution test cycle to determine the most appropriate resolution according to certain current conditions related to the optical navigation system 100. A timer 128 triggers the resolution switching engine 130 to start a resolution test cycle, and the resolution switching engine 130 uses the timer to calculate a motion speed related to the motion data. Based on the calculated speed of the motion data, the resolution switching engine 130 selects the most appropriate resolution. High resolution allows a user to move a cursor quickly across a monitor screen of a computing device 102, while low resolution allows a user to place the cursor accurately and precisely. For example, low resolution facilitates selecting a small icon on the monitor screen of the computing device 102.

At block 308, the surface detection engine 132 sets the current lift state based on the current resolution state, as explained above. The operations of the surface detection engine 132 facilitate smooth and steady initial response and acceleration in assert and de-assert events while a user moves a cursor quickly across a monitor screen at high resolution, and accurate and precise cursor movement in assert and de-assert events while a user moves a cursor slowly at low resolution, all while maintaining the sensitivity of the navigation sensor IC 110. At block 310, depending on the current lift state set by the surface detection engine 132, the navigation engine 118 reports the motion data to the computing device 102. Additional details of the adaptive surface detection method 300 are described in further detail below in relation to FIG. 4 and FIG. 5.

Figure 4A:
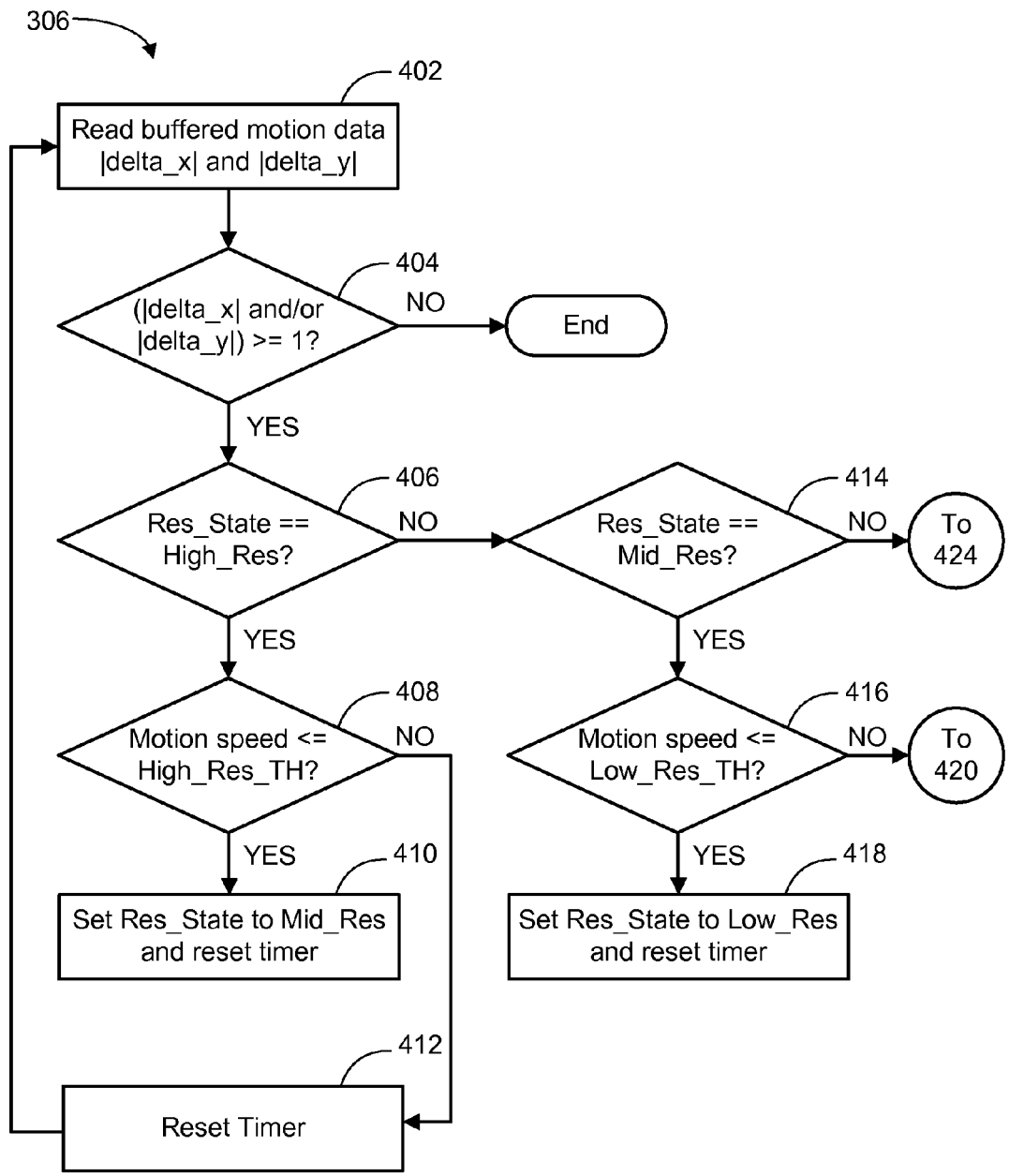
FIG. 4, including 4A and 4B, depicts a more detailed embodiment of the resolution switching operation of the integrated resolution switching surface detection method of FIG. 3.
Figure 4B:
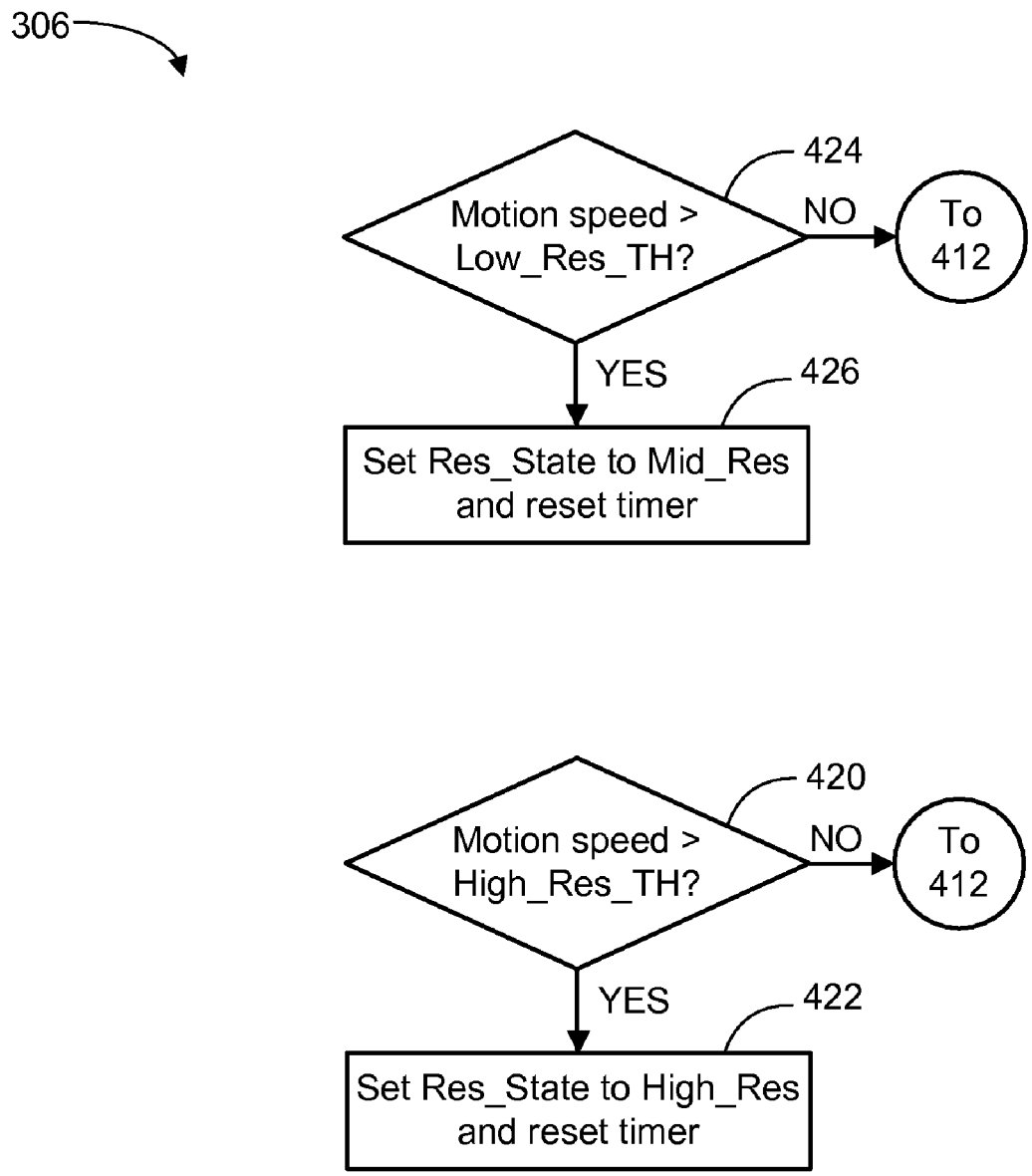

FIG. 4 depicts a more detailed embodiment of the resolution switching operation 306 of the integrated resolution switching surface detection method 300 of FIG. 3. Although the resolution switching operation 306 is described in conjunction with the integrated resolution switching surface detection method 300 of FIG. 3, some embodiments of the operation 306 may be implemented with other types of integrated resolution switching surface detection methods.

At block 402, the resolution switching engine 130 reads the buffered motion data currently stored in the buffer 126, which contains the magnitudes, or absolute values, of delta X and delta Y. Next, at block 404, the resolution switching engine 130 determines whether the magnitudes of the buffered motion data of delta X and delta Y indicate movement. This allows the resolution switching engine 130 to determine whether one or the other is non-zero, or whether both are non-zero. In other words, when the navigation sensor 114 detects movement, the values of delta X and/or delta Y will indicate movement as non-zero values. When the values of delta X and delta Y of a given pair of captured images both contain values of zero, indicating the navigation sensor 114 did not detect any movement at the finger interface 104 for the given captured image, then the resolution switching engine 130 maintains the current resolution status, and the current cycle of the resolution switching operation 306 ends. When no movement is detected, in one embodiment, the timer 128 is reset to trigger a new resolution switching test cycle to test and cycle another set of buffered motion data.

Otherwise, when the resolution switching engine 130 determines that the values of the buffered motion data are non-zero and, therefore, indicate movement, then the resolution switching operation 306 proceeds to block 406 to determine whether the current resolution status is set to high resolution. In the depicted resolution switching operation 306, there are three resolution states that the resolution switching engine 130 can select from. In other embodiments, there are a different number of resolution states to select from.

At block 406, when the resolution switching engine 130 determines that the current resolution status is set to high resolution, then, at block 408, the resolution switching operation 306 determines whether the current calculated motion speed of the buffered motion data is less than or equal to a high resolution threshold. The function of the resolution threshold and related calculation of motion speed operate in a substantially similar manner as explained above in relation to FIG. 2. When the resolution switching operation 306 determines that the calculated motion speed is less than or equal to a high resolution threshold, then, at block 410, the resolution switching engine 130 sets the current resolution state to mid resolution and resets the timer 128 to trigger the next cycle of the resolution switching operation 306. Alternatively, if the resolution switching operation 306 determines that the calculated motion speed is not less than or equal to the high resolution threshold, then, at block 412, the timer 128 is reset to trigger a new cycle of the resolution switching operation 306.

At block 406, when the resolution switching engine 130 determines that the current resolution status is not set to high resolution, then, at block 414, the resolution switching operation 306 determines whether the current resolution status is set to mid resolution. If the resolution switching engine 130 determines that the current resolution status is set to mid resolution, then, at block 416, the resolution switching operation 306 determines whether the current calculated motion speed is less than or equal to a low resolution threshold. When the resolution switching operation 306 determines, at block 416, that the calculated motion speed is not less than or equal to the low resolution threshold, then the resolution switching operation 306 determines, at block 420, whether the current calculated motion speed is greater than the high resolution threshold. Otherwise, the resolution switching operation 306 proceeds to block 418, where the resolution switching engine 130 sets the current resolution state to low resolution and resets the timer 128 to trigger the next cycle of the resolution switching operation 306.

When the resolution switching operation 306 determines, at block 420, that the calculated motion speed is not greater than the high resolution threshold, then, at block 412, the timer 128 is reset to trigger a new cycle of the resolution switching operation 306. Otherwise, at block 422, the resolution switching engine 130 sets the current resolution state to high resolution and resets the timer 128 to trigger the next cycle of the resolution switching operation 306.

At block 414, when the resolution switching engine 130 determines that the current resolution status is not set to mid resolution, then, at block 424, the resolution switching operation 306 determines whether the current calculated motion speed is greater than the low resolution threshold. When the motion speed is not greater than the low resolution threshold, then, at block 412, the timer 128 is reset to trigger a new cycle of the resolution switching operation 306. Otherwise, at block 426, the resolution switching engine 130 sets the current resolution state to mid resolution and resets the timer 128 to trigger a new cycle of the resolution switching operation 306.

Figure 5A:
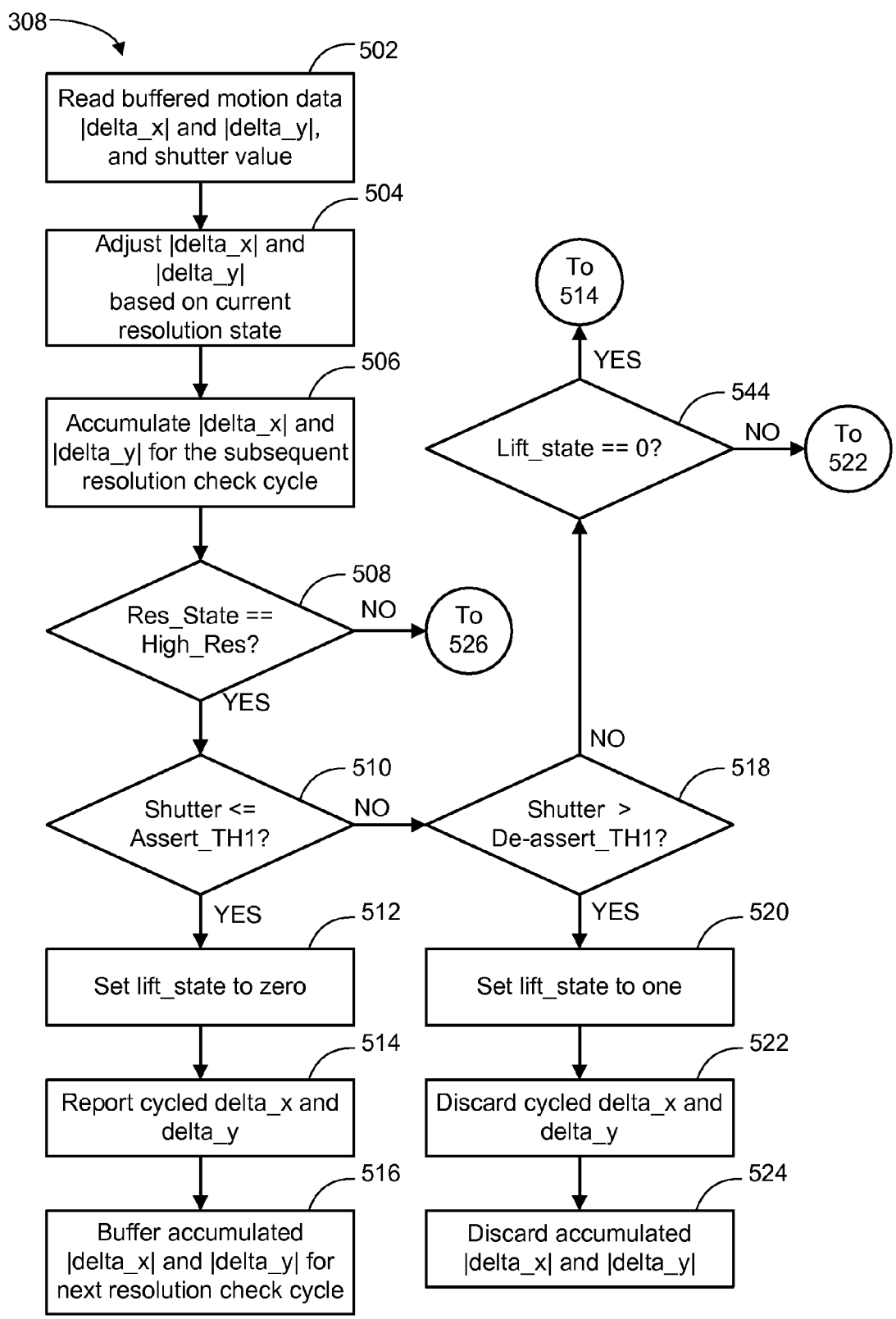
FIG. 5, including 5A and 5B, depicts a more detailed embodiment of the surface detection operation of the integrated resolution switching surface detection method of FIG. 3.
Figure 5B:
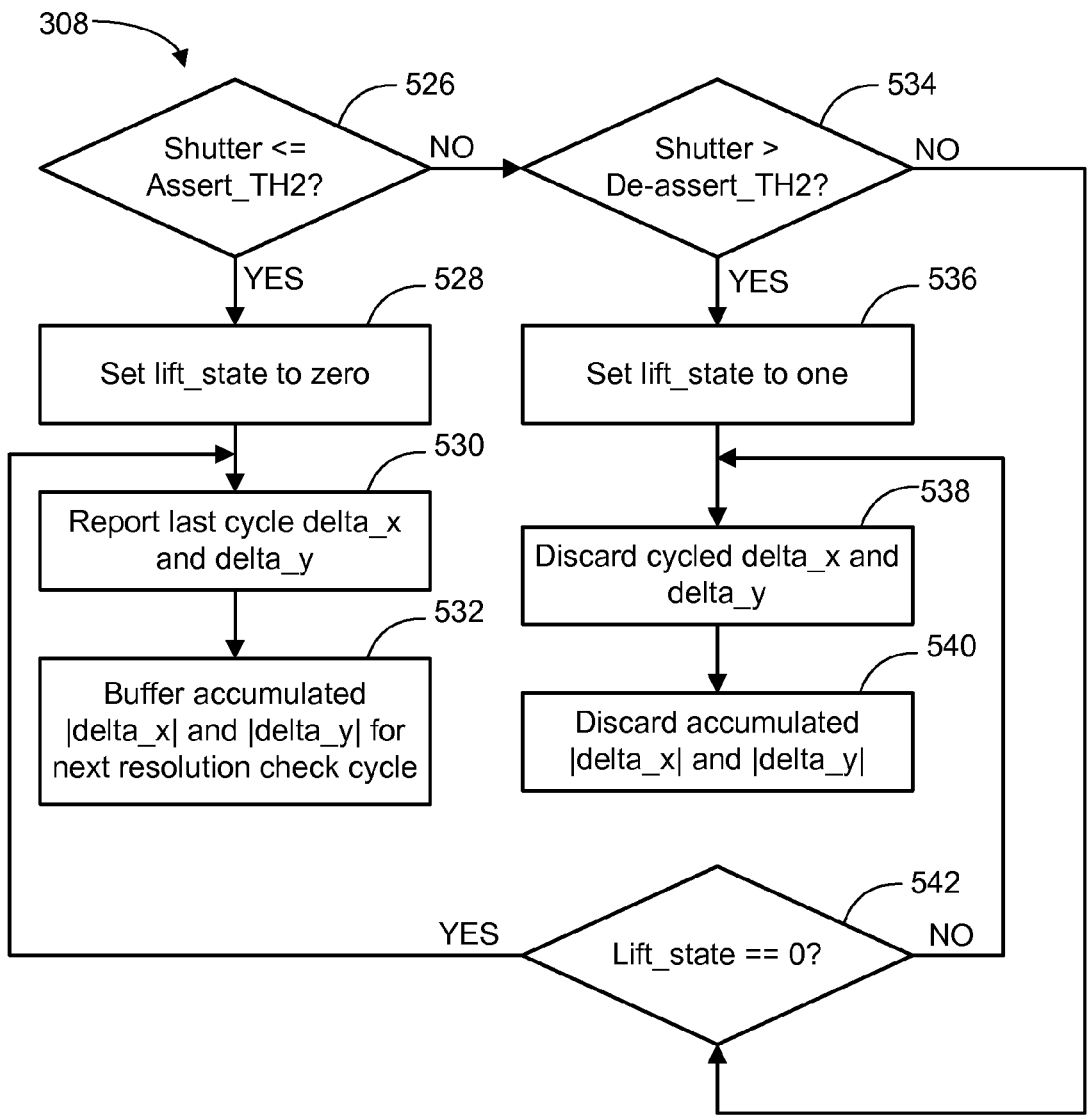

FIG. 5 depicts a more detailed embodiment of the surface detection operation 308 of the integrated resolution switching surface detection method 300 of FIG. 3. Although the surface detection operation 308 is described in conjunction with the integrated resolution switching surface detection method 300 of FIG. 3, some embodiments of the operation 308 may be implemented with other types of integrated resolution switching surface detection methods.

At block 502, the surface detection engine 132 reads the buffered motion data currently stored in the buffer 126 and the current shutter value from the shutter controller 116. Next, at block 504, the surface detection method 308 adjusts the buffered delta X and delta Y according to the current resolution state. For example, in the case when there is a high resolution, mid resolution, and low resolution, the actual resolutions for each state may be 1000 dots per inch (dpi) for high resolution, 500 dpi for mid resolution (multiplied by a factor, as described below), and 500 dpi for low resolution. Since, in this case, the mid resolution and low resolution have equivalent actual resolution values, the motion data may be multiplied by a scalar value, such as 1.5, when the resolution state is set to mid resolution in order to give the cursor an increased acceleration over the equivalent actual resolution value.

Next, at block 506, the surface detection engine 132 accumulates the magnitudes of the current motion data, delta X and delta Y, received from the navigation engine 118, different from the delta X and delta Y currently buffered in the buffer 126. In other words, the navigation engine 118 continues to receive motion data from the navigation sensor 118 during a cycle of the integrated resolution switching surface detection method 300, and the surface detection engine 132, during the surface detection method 308, accumulates the motion data currently available from the navigation engine 118. In one embodiment, the sensor detection engine 132 accumulates at least one set of delta X and delta Y motion data.

Next, the surface detection method proceeds to block 508. At block 508 the surface detection engine 132 determines whether the present resolution status is set to high resolution. In the depicted surface detection method 308, similar to the resolution switching engine 130, there are three resolution states. However, other embodiments may use fewer or more resolution states.

At block 508, when the surface detection engine 132 determines that the current resolution status is not set to high resolution, then the surface detection method 308 proceeds to block 526, where the surface detection engine 132 determines whether the shutter value is less than or equal to the surface detection threshold assert_TH2. Otherwise, when the surface detection engine 132 determines that the current resolution status is set to high resolution, then, at block 510, the surface detection method 308 determines whether the current shutter value from the shutter controller 116 is less than or equal to a surface detection threshold, assert_TH1. In one embodiment, the surface detection thresholds are defined in pairs such that a hysteresis window exists between a given set of assert and de-assert thresholds.

At block 510, when the surface detection engine 132 determines that the shutter value is not less than or equal to the surface detection threshold assert_TH1, then the surface detection method 308 proceeds to block 518 to determine whether the shutter value is greater than the surface detection threshold de-assert_TH1.

When, at block 510, the surfaced detection engine 132 determines that the shutter value is less than or equal to assert_TH1, then, the surface detection method 308 proceeds to block 512. At block 512, the surface detection engine 132 sets the surface detection status, or lift state, to zero, or logically false, to indicate that a user's digit 106 is currently within a detectable range of the finger interface 106, as defined by the surface detection threshold based on the current resolution status. At block 514, the delta X and delta Y values that have passed through a cycle of the integrated resolution switching surface detection method 300 are then reported to the computing device 102 as tracking data related to cursor movement. Next, at block 516, the surface detection engine 132 sends a delta X and delta Y set of motion data that was accumulated in the operation of block 506 to the buffer 126 for use in a subsequent cycle of the integrated resolution switching surface detection method 300.

At block 518, when the surface detection engine 132 determines that the shutter value is not greater than the surface detection threshold de-assert_TH1, then the surface detection method 308 proceeds to block 544. At block 544, the surface detection engine 132 determines whether the lift state is currently equal to zero, or lift_state=0. If the surface detection engine 132 determines that the lift state is currently equal to zero, or that lift_state=0, then the surface detection method 308 proceeds to block 514. Otherwise, if the surface detection engine 132 determines that the lift state is not currently equal to zero, or that lift_state=1, then the surface detection method 308 proceeds to block 522. Thus, the lift state remains unchanged until the surface detection engine 132 determines that the shutter value is less than or equal to assert_TH1, or the surface detection engine 132 determines that the shutter value is greater than de-assert_TH1. As explained above, the hysteresis window is a state of indeterminate surface detection status where a user's digit 108 is neither lifted away nor placed on the finger interface 106 as defined by the surface detection thresholds. In other words, if a finger is currently asserted, and the finger starts to move away from sensing area, then the lift state is maintained at 0 until the surface detection engine 132 detects the de-assert threshold. If the finger is currently de-asserted and starts to close in to the sensing area, then the lift state is maintained at 1 until the surface detection engine 132 detects the assert threshold.

At block 518, when the surface detection engine 132 determines that the shutter value is greater than the surface detection threshold de-assert_TH1, then the surface detection method 308 proceeds to block 520. At block 520, the surface detection engine 132 sets the surface detection status, or lift state, to one, or logically true, to indicate that a user's digit 108 is currently not within a detectable range of the finger interface 106, as defined by a surface detection threshold based on the current resolution status. At block 522, the delta X and delta Y values that have passed through a cycle of the integrated resolution switching surface detection method 300 are then discarded. Next, at block 524, the surface detection engine 132 discards the delta X and delta Y set of motion data that was accumulated in the operation of block 506. The cycled and accumulated motion data are discarded in operations of blocks 522 and 524 since the surface detection engine 132 detected that there is no digit 108 asserted on the finger interface 106. Since there is no digit 108 to track, then the surface detection method 308 discards the currently cycled and accumulated motion data in order to avoid unexpected movement of the mouse cursor on a monitor screen of a computing device 102.

At block 526, when the surface detection engine 132 determines that the shutter value is not less than or equal to the surface detection threshold assert_TH2, then the surface detection method 308 proceeds to block 534, where the surface detection engine 132 determines whether the shutter value is greater than the surface detection threshold de-assert_TH2. Otherwise, when the surface detection engine 132 determines that the shutter value is less than or equal to assert_TH2, the surface detection method 308 proceeds to block 528. At block 528, the surface detection engine 132 sets the surface detection status, or lift state, to zero, or logically false, to indicate that a user's digit 108 is currently within a detectable range of the finger interface 106, as defined by the surface detection threshold assert_TH2. At block 530, the delta X and delta Y values that have passed through a cycle of the integrated resolution switching surface detection method 300 are then reported to the computing device 102 as tracking data related to cursor movement. Next, at block 532, the surface detection engine 132 sends a delta X and delta Y set of motion data that was accumulated in the operation of block 506 to the buffer 126 for use in a subsequent cycle of the integrated resolution switching surface detection method 300.

At block 534, when the surface detection engine 132 determines that the shutter value is not greater than the surface detection threshold de-assert_TH2, then the surface detection method 308 proceeds to block 542. At block 542, the surface detection engine 132 determines whether the lift state is currently equal to zero, or lift_state=0. If the surface detection engine 132 determines that the lift state is currently equal to zero, or that lift_state=0, then the surface detection method 308 proceeds to block 530. Otherwise, if the surface detection engine 132 determines that the lift state is not currently equal to zero, or that lift_state=1, then the surface detection method 308 proceeds to block 538. Thus, the lift state remains unchanged until the surface detection engine 132 determines that the shutter value is less than or equal to assert_TH2, or the surface detection engine 132 determines that the shutter value is greater than de-assert_TH2.

At block 534, when the surface detection engine 132 determines that the shutter value is greater than the surface detection threshold de-assert_TH2, then the surface detection method 308 proceeds to block 536. At block 536, the surface detection engine 132 sets the surface detection status, or lift state, to one, or logically true, to indicate that a user's digit 108 is currently not within a detectable range of the finger interface 106, as defined by the surface detection threshold de-assert_TH2. At block 538, the delta X and delta Y values that have passed through a cycle of the integrated resolution switching surface detection method 300 are then discarded. Next, at block 540, the surface detection engine 132 discards the delta X and delta Y set of motion data that was accumulated in the operation of block 506.

In one embodiment, there are four surface detection thresholds, and the four surface detection thresholds include two sets or pairs. As depicted in FIG. 5, when the resolution state is set at high resolution, the surface detection engine 132 may compare the shutter value to assert_TH1 and de-assert_TH1. When the resolution state is set at mid or low resolution, then the surface detection engine 132 may compare the shutter value to assert_TH2 and de-assertTH2. In other embodiments, there is any number of surface detection thresholds, and a set of surface detection thresholds includes at least one surface detection threshold.

Regarding the definition of surface detection thresholds, assert_TH1 is a lower value than de-assert_TH1. Similarly, assert_TH2 is a lower value than de-assert_TH2. Thus, the plurality surface detection thresholds are defined such that they provide a hysteresis window in the comparison of the shutter value to one of the plurality of surface detection thresholds. The hysteresis window facilitates the reduction of surface detection status oscillation, providing an intentional lag when user input is indeterminate. For example, as a digit 108 is pulled out from the tracking plane of the navigation sensor 114 or is moved toward the tracking plane of the navigation sensor 114, the reflection of light off the digit 108 may fluctuate between the detectable levels of reflection that indicate a digit 108 is in the tracking plane of the navigation sensor 114 and the detectable levels that indicate a digit 108 is removed from the tracking plane of the navigation sensor 114. Thus, without the hysteresis window, the surface detection status would oscillate when a digit 108 was moving away from or moving toward the tracking plane of the navigation sensor 114, which in turn would cause the cursor to appear jittery on a monitor screen of a computing device 102. In other words, when pulling a finger away, any motion data will be reported until the de-assert_TH threshold is exceeded, avoiding any potential surface detection status oscillation. From the other direction, if the finger is closing in to the surface, any motion data will be discarded until the assert_TH threshold is exceeded. Thus, the result of the hysteresis window is smooth and predictable cursor movement on the monitor screen of the computing device 102.

Additionally, regarding the definitions of surface detection thresholds, assert_TH1 is a higher value than assert_TH2, and de-assert_TH1 is a higher value than de-assert_TH2. At mid or low resolution, defining the surface detection thresholds in this way provides a quick response in cutting off tracking when a user's digit 108 is de-asserted and slower initialization of tracking when the user's digit 108 is asserted, where the intention is to place a cursor accurately and precisely. At high resolution, defining the surface detection threshold as described above provides a relaxed cut off of tracking when a user's digit 108 is de-asserted and faster initialization of tracking when asserted, where the intention is to "skate" or move quickly across the monitor screen with a minimum number of strokes across the finger interface 106.

Embodiments of the integrated resolution switching surface detection system and method 300 described can have a real and positive impact on maintaining smooth and steady operation of a mouse cursor on a monitor screen of a computing device 102 as controlled by a digit 108, or finger, of a user on an optical finger navigation device. Additionally, some embodiments provide a rapid tracking cutoff and slow initialization in mid or low resolution state for accurate cursor placement. Furthermore, some embodiments provide a relaxed tracking cutoff and rapid initialization in a high resolution state for moving a cursor quickly across a monitor screen. Also, some embodiments substantially prevent surface detection status oscillation by providing a hysteresis window in relation to surface detection status.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation system comprising:
a resolution switching engine to set a resolution status based on a motion speed of a tracking surface relative to an optical finger navigation sensor, wherein the motion speed is a measure of motion data over time;
a surface detection engine coupled to the resolution switching engine, the surface detection engine to set a surface detection status based on the present resolution status that is set by the resolution switching engine; and
a navigation engine coupled to the surface detection engine, the navigation engine to read the motion data from the navigation sensor and to report the motion data to a computing device according to the present surface detection status that is set by the surface detection engine in response to the detection engine detecting a shutter value below a first threshold value, and wherein the navigation engine is further configured to discard the motion data from the navigation sensor in response to the surface detection engine detecting a shutter value above a second threshold value.

2. The optical navigation system of claim 1, further comprising a timer coupled to the resolution switching engine, the timer to trigger the resolution switching engine to start an integrated resolution switching surface detection test cycle, wherein the navigation engine is further configured to report the motion data to the computing device according to a surface detection status determined in the integrated resolution switching surface detection test cycle.

3. The optical navigation system of claim 2, wherein the navigation engine is further configured to multiply the motion data by a scalar and report the scaled motion data to the computing device, wherein a value of the scalar is determined according to the present resolution status.

4. The optical navigation system of claim 1, wherein the surface detection engine is further configured to adapt a comparison of the shutter value to at least one of a plurality of surface detection thresholds according to the present resolution status.

5. The optical navigation system of claim 4, wherein the surface detection engine is further configured to provide a hysteresis window based on the comparison of the shutter value to at least one of the plurality of surface detection thresholds, wherein the hysteresis window reduces a surface detection status oscillation.

6. The optical navigation system of claim 1, wherein the surface detection engine is further configured to compare a surface quality value to one of a plurality of surface detection thresholds, wherein the surface detection engine is further configured to set the surface detection status based on the comparison and the present resolution status.

7. The optical navigation system of claim 1, wherein the surface detection engine is further configured to accumulate an absolute value of subsequent motion data that is read by the navigation engine during a current integrated resolution switching surface detection test cycle.

8. The optical navigation system of claim 7, further comprising a buffer coupled to the surface detection engine, the buffer to store the absolute value of the motion data accumulated by the surface detection engine for use in a subsequent integrated resolution switching surface detection test cycle.

9. A method comprising:
setting a resolution status based on a motion speed of a tracking surface relative to an optical finger navigation sensor, wherein the motion speed is a measure of motion data over time;
setting a surface detection status based on the present resolution status that is set by a resolution switching engine; and
reading motion data from the navigation sensor and reporting the motion data to a computing device according to the present surface detection status that is set by a surface detection engine in response to detecting a shutter value below a first threshold value; and
discarding the motion data from the navigation sensor in response to detecting a shutter value above a second threshold value.

10. The method of claim 9 further comprising triggering the resolution switching engine to start an integrated resolution switching surface detection test cycle, wherein the motion data is reported to the computing device according to the surface detection status that is determined in said integrated resolution switching surface detection test cycle.

11. The method of claim 10 further comprising multiplying the motion data by a scalar and reporting the scaled motion data to the computing device, wherein a value of the scalar is determined according to the present resolution status.

12. The method of claim 9 further comprising adapting a comparison of the shutter value to at least one of a plurality of surface detection thresholds according to the present resolution status.

13. The method of claim 12 further comprising defining the plurality of surface detection thresholds such that the comparison of the shutter value to at least one of the plurality of surface detection thresholds provides a hysteresis window, wherein the hysteresis window reduces a surface detection status oscillation.

14. The method of claim 9 further comprising comparing a surface quality value to one of a plurality of surface detection thresholds, wherein the surface detection engine sets the surface detection status based on said comparison and the present resolution status.

15. The method of claim 9 further comprising buffering an absolute value of motion data that is accumulated by the surface detection engine for use in a subsequent integrated resolution switching surface detection test cycle.

16. An optical finger navigation system, the optical finger navigation system comprising:
a light source to illuminate a tracking surface, wherein the tracking surface comprises a finger of a user;
a navigation sensor to detect motion data relative to the tracking surface, wherein the motion data comprises a first displacement in a first direction and a second displacement in a second direction;
a time based resolution switching engine to set a resolution status according to a comparison of a detected speed of the motion data to one of a plurality of resolution thresholds, wherein the speed of the motion data is a distance the tracking surface moves over a certain period of time as detected by the navigation sensor;
a resolution based surface detection engine to set a surface detection status based on the present resolution status and a present shutter value;
a plurality of surface detection thresholds, wherein the plurality of surface detection thresholds provide a hysteresis window to reduce a surface detection status oscillation; and
an adaptive navigation sensor to report motion data read from the navigation sensor to a computing device in response to detecting a shutter value at a first threshold value and wherein the navigation sensor is configured to discard the motion data in response to detecting a shutter value at a second threshold value according to the surface detection status that is determined in an integrated resolution switching surface detection test cycle.

* * * * *